(12) United States Patent  
Kwon

(10) Patent No.: US 6,829,015 B2  
(45) Date of Patent: Dec. 7, 2004

(54) DEVICE AND METHOD FOR REALIZING TRANSPARENCY IN AN ON SCREEN DISPLAY

(75) Inventor: Dae-Heon Kwon, Kyongsangbuk-do (KR)

(73) Assignee: Samsung Electronics Co., Ltd. (KR)

( * ) Notice: Subject to any disclaimer, the term of this patent is extended or adjusted under 35 U.S.C. 154(b) by 432 days.

(21) Appl. No.: 09/931,134

(22) Filed: Aug. 16, 2001

(65) Prior Publication Data

US 2002/0097339 A1 Jul. 25, 2002

(30) Foreign Application Priority Data

Jan. 19, 2001 (KR) .......................................... 2001-3100

(51) Int. Cl.⁷ ............................. H04N 5/50; H04N 9/74
(52) U.S. Cl. ...................... 348/569; 348/593; 348/590; 348/586
(58) Field of Search ................................. 348/569, 563, 348/564, 565, 566, 567, 584, 586, 585, 590, 593, 594, 595; 345/592, 629; H04N 5/50, 5/445, 5/45, 9/74, 9/75, 9/76

(56) References Cited

U.S. PATENT DOCUMENTS 4,533,937 A * 8/1985 Yamamoto et al. ......... 348/592
6,023,302 A    2/2000 MacInnis et al.
6,305,016 B1 * 10/2001 Marshall et al. ............... 725/41
6,348,953 B1 * 2/2002 Rybczynski .................. 348/584
6,462,746 B1 * 10/2002 Min et al. .................... 348/569
6,466,224 B1 * 10/2002 Nagata et al. ............... 345/592
6,538,396 B1 * 3/2003 Vlahos et al. ............... 348/586
6,571,012 B1 * 5/2003 Pettigrew ..................... 348/592

FOREIGN PATENT DOCUMENTS

EP  0 384 257        2/1990
EP  0 524 461 A2    7/1992
EP  0 712 241 A2   11/1995

OTHER PUBLICATIONS

European Search Report dated Jan. 30, 2004 issued in a counterpart application, namely, Appln. No. 01122757.6.

* cited by examiner

Primary Examiner—Sherrie Hsia  
(74) Attorney, Agent, or Firm—Dilworth & Barrese LLP

(57) ABSTRACT

Disclosed is a device and method for realizing transparency. When a user requests a transparent function, a specific background color that is selected to be transparent by the user is identified in an OSD transparent mode and an image with YUV image data inserted instead of the OSD background color data is displayed upon receipt of the OSD background color data. In a YUV transparent mode, a specific background color that is selected to be transparent by the user is identified and an image with OSD image data inserted instead of the YUV background color data is displayed upon receipt of the YUV background color data.

12 Claims, 6 Drawing Sheets

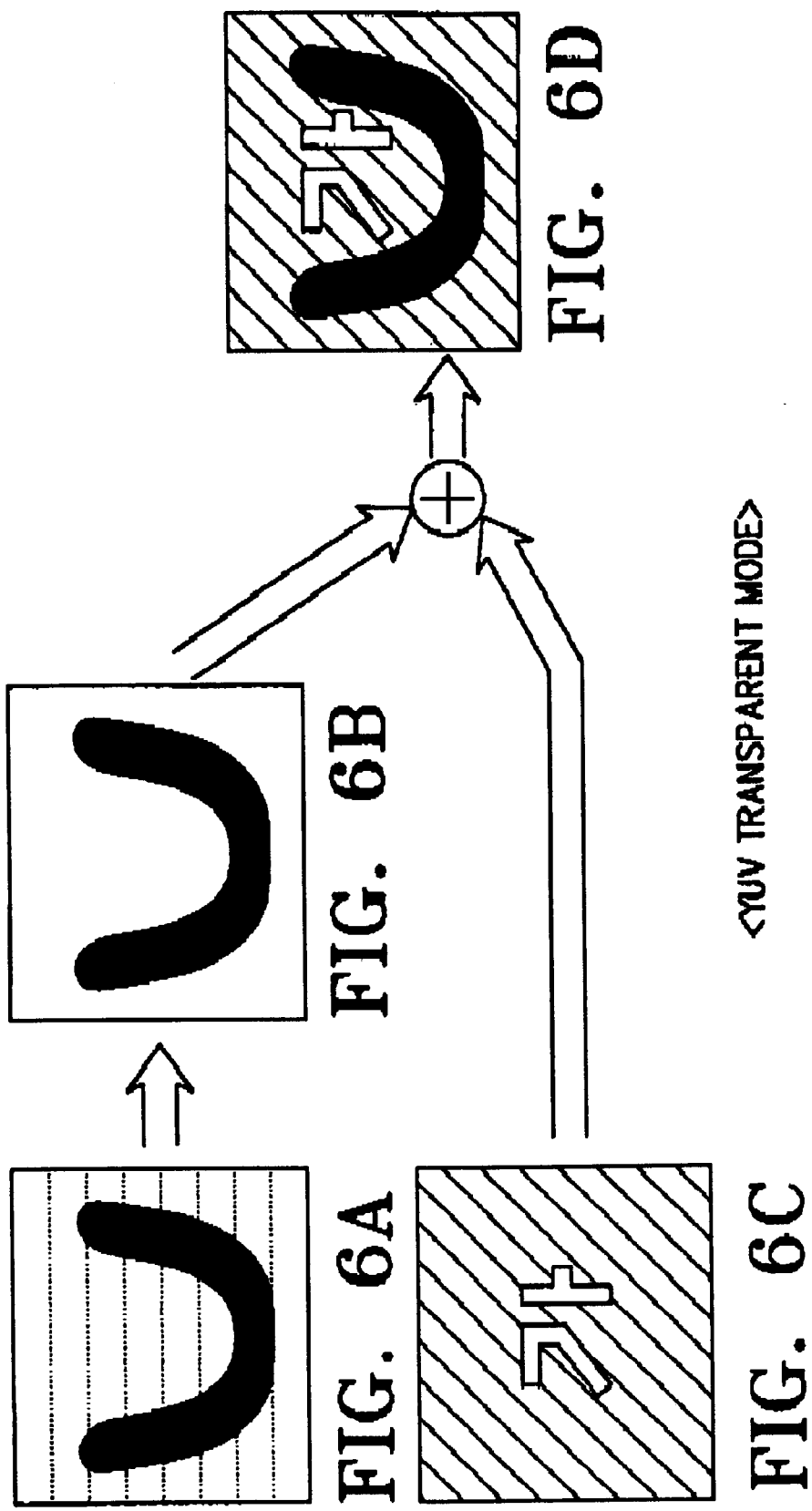

DEVICE AND METHOD FOR REALIZING TRANSPARENCY IN AN ON SCREEN DISPLAY

PRIORITY

This application claims priority to an application entitled "Device and Method for Realizing Transparency" filed in the Korean Industrial Property Office on Jan. 19, 2001 and assigned Ser. No. 2001-3100, the contents of which are hereby incorporated by reference.

BACKGROUND OF THE INVENTION

1. Field of the Invention

The present invention relates generally to a mobile terminal, and in particular, to a device and method for implementing an OSD/YUV transparent function.

2. Description of the Related Art

An OSD (On Screen Display) technique is widely used for an image processing systems such as televisions, PCs (Personal Computers), and mobile terminals. The OSD function displays additional information such as a selected channel and time on a television, and displays characters together with a YUV background image on a computer or a mobile terminal.

However, a conventional OSD technique exhibits a shortcoming in that an OSD background color area on the display of a PC, a TV, or a mobile terminal hides an initial background image. If the OSD background color area is made transparent to solve the problem, only an identical color becomes transparent and thus a user cannot change or set a specific color when necessary.

SUMMARY OF THE INVENTION

It is, therefore, an object of the present invention to provide a device and method for realizing transparency in order to prevent an OSD background color from covering an initial background in an OSD display of an image display device.

It is another object of the present invention to provide a device and method for realizing transparency in YUV image data for display of a background.

The foregoing and other objects can be achieved by providing a device and method for realizing transparency. When a user requests a transparent function, a specific background color selected by the user to be transparent is identified in an OSD transparent mode and an image with YUV image data inserted instead of the OSD background color data is displayed upon receipt of the OSD background color data. In a YUV transparent mode, a specific background color selected by the user to be transparent is identified and an image with OSD image data inserted instead of the YUV background color data is displayed upon receipt of the YUV background color data.

BRIEF DESCRIPTION OF THE DRAWINGS

The above and other objects, features and advantages of the present invention will become more apparent from the following detailed description when taken in conjunction with the accompanying drawings in which:

FIGS. 5A to 6D illustrate exemplary image displays when an OSD/YUV transparent function is implemented according to the second embodiment of the present invention.

DETAILED DESCRIPTION OF THE PREFERRED EMBODIMENTS

Preferred embodiments of the present invention will be described hereinbelow with reference to the accompanying drawings. In the following description, well-known functions or constructions are not described in detail since they would obscure the invention in unnecessary detail.

Figure 1:
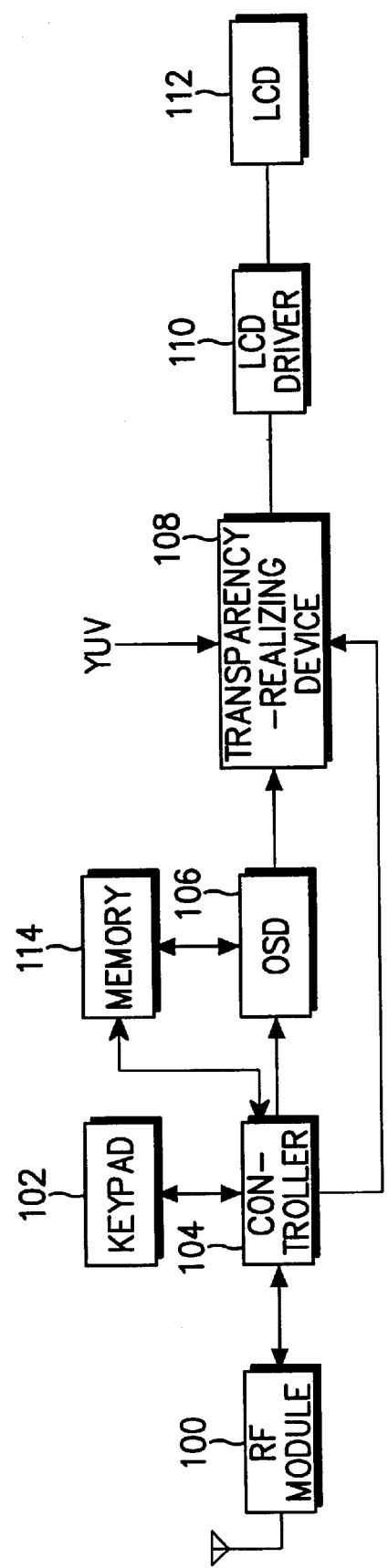
FIG. 1 is a block diagram of a mobile terminal having a transparency-realizing device according to an embodiment of the present invention.

FIG. 1 is a schematic block diagram of a mobile terminal that can perform a transparent function on OSD and background YUV image data according to an embodiment of the present invention. Referring to FIG. 1, an RF (Radio Frequency) module 100 includes an RF processor, an IF (Intermediate Frequency) processor, and a baseband processor. The RF module 100 primarily processes an RF signal, downconverts the RF signal to an IF signal, and downconverts the IF signal to a bit stream in a baseband suitable for processing in a controller 104. The RF module 100 is divided into a transmitter and a receiver. The receiver amplifies an intended signal, suppressing amplification of as much noise as possible, converts the amplified signal to an IF signal and then a baseband signal, and converts the analog baseband signal to a digital signal. The digital signal is analyzed and processed in the controller 104. The transmitter modulates a signal generated from the controller 104 to a desired frequency band, amplifies the modulated signal, and radiates the amplified signal through a duplexer (not shown) and an antenna.

The controller 104 provides overall control to the mobile terminal and stores the identification data of a background color selected by a user to be transparent in a register of a transparency-realizing device 108. A memory 114 temporarily stores the operation program of the controller 104, data generated during execution of the program of the controller 104, and font and background data for an OSD display. A keypad 102 is formed in a key matrix including character keys, digit keys, and function keys, and feeds key input signals corresponding to keys pressed by the user to the controller 104.

An OSD 106 processes color data of a background and color LCD fonts and applies an RGB signal of data to an LCD driver 110 through its internal encoder. The LCD driver 110 controls the operation of an LCD 112 under the control of the controller 104. The LCD 112 displays operational states of the mobile terminal and OSD data under the control of the controller 104. The transparency realizing device 108 receives transparent control data from the controller 104 and updates a register value based on the control data, removes a background color corresponding to transparency-selected identification data from OSD image data received from the OSD 106, and the modified OSD image data to the LCD driver 110.

Figure 2:
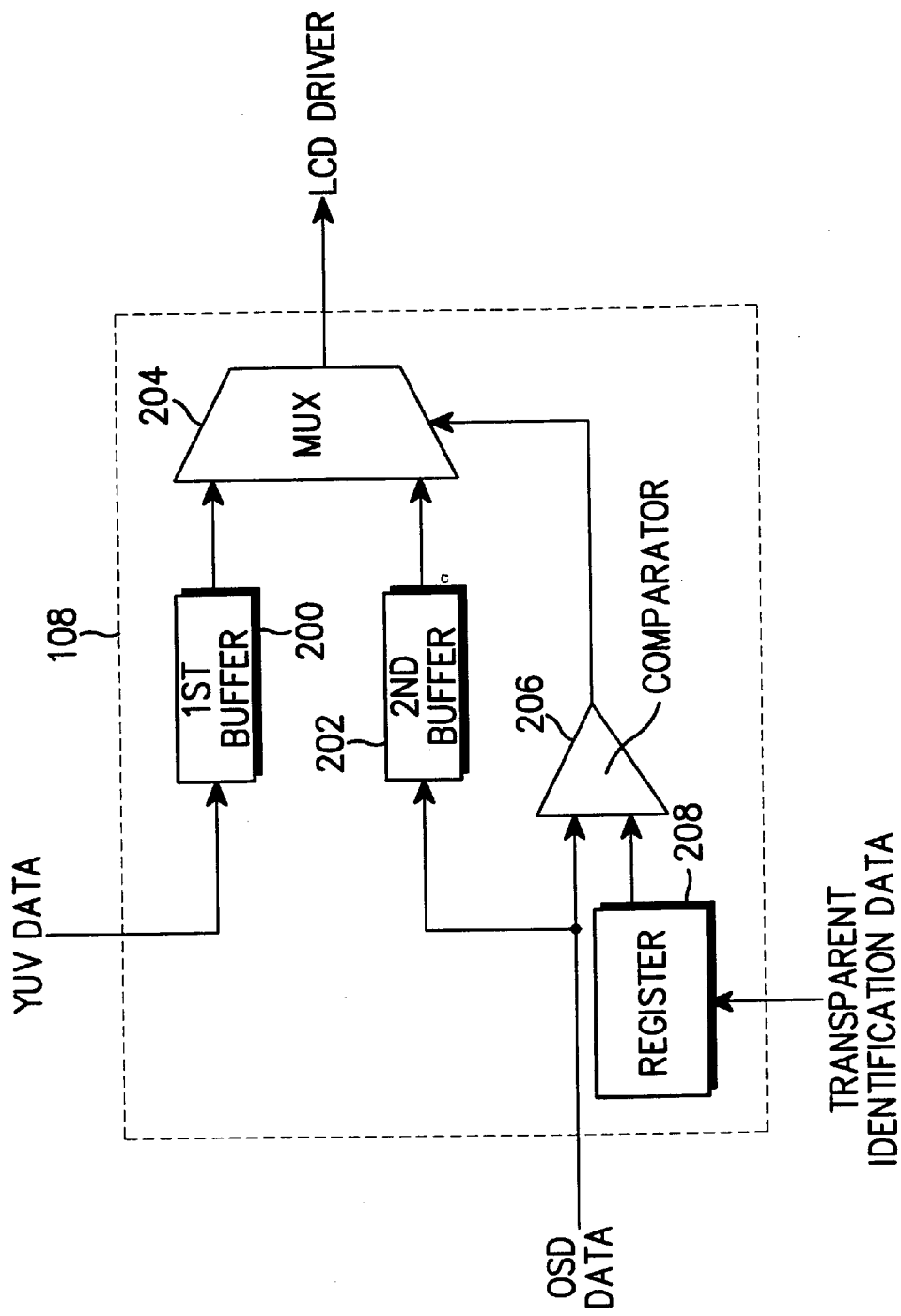
FIG. 2 is a block diagram of the transparency-realizing device according to the embodiment of the present invention.
Figure 3:
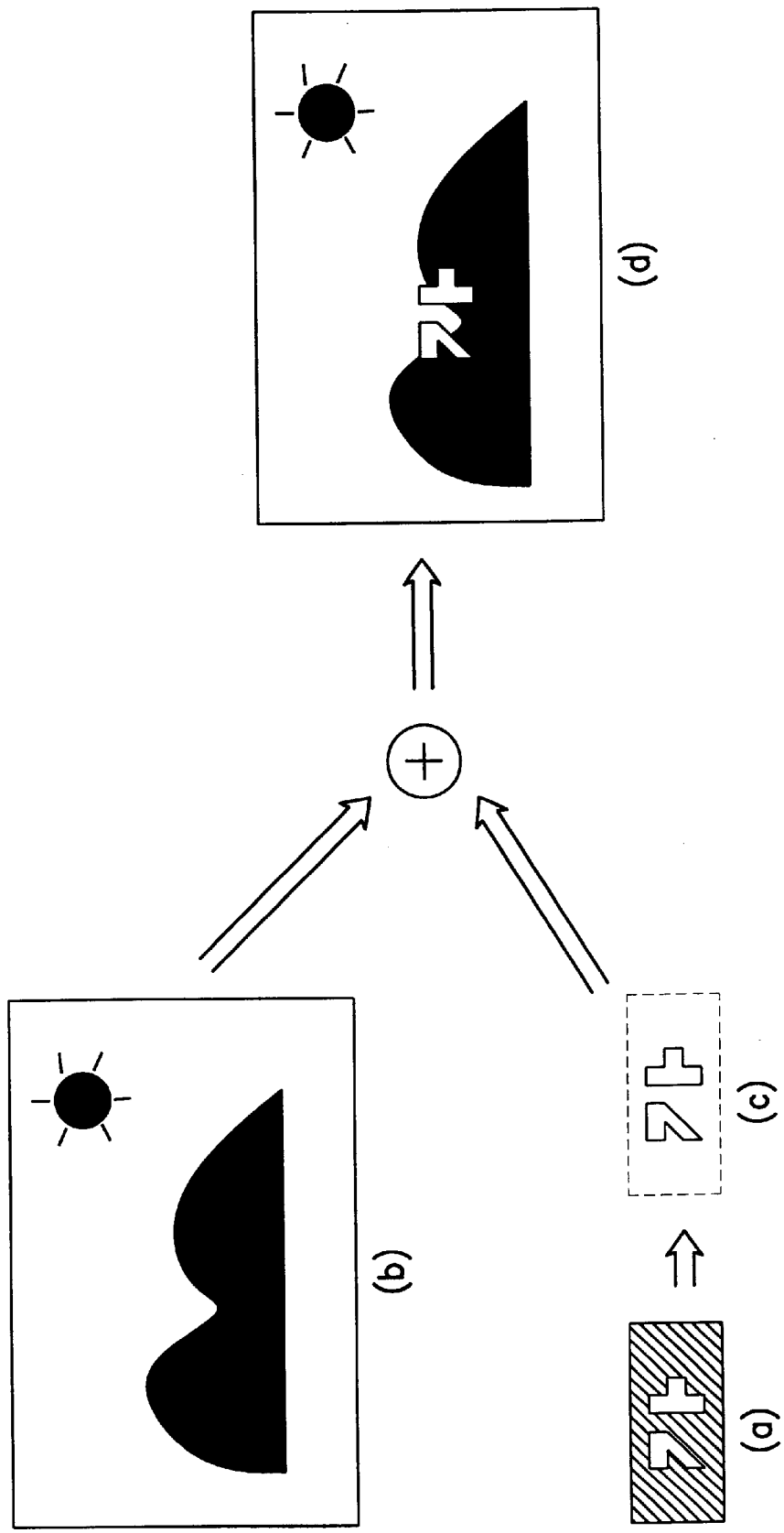
FIGS. 3A to 3D illustrate exemplary image displays when a transparent function is implemented according to the embodiment of the present invention.

FIG. 2 is a detailed block diagram of the transparency realizing device 108 and FIGS. 3A to 3D illustrate exemplary image displays in the process of removing a specific background color from OSD image data in the transparency realizing device 108. The operation of the transparency-realizing device will be described in detail referring to FIGS. 2 to 3D.

Typical OSD image data generated from the OSD 106 is composed of a character against a specific colored background as shown in FIG. 3A. The OSD image data is fed to an input terminal of a comparator 206 and stored in a second buffer 202 in the transparency-realizing device 108.

Upon user request of rendering a specific background color transparent, the controller 104 stores transparent identification data in a register 208 connected to the other input terminal of the comparator 206. The transparent identification data is used to identify the specific background color selected by the user in the OSD image data and to remove the background color from the OSD image data in the LCD 112. Upon receipt of background color data corresponding to the transparent identification data stored in the register 208, the comparator 206 outputs a selection control signal to a multiplexer (MUX) 204 so that the multiplexer 204 outputs not the OSD background color data but YUV image data for a background buffered in a first buffer 200. Therefore, if a background image shown in FIG. 3B is displayed on the LCD 112, an OSD image of FIG. 3C, produced by removing the transparency-selected background color from the OSD image data shown in FIG. 3A, and the YUV image shown in FIG. 3B forms a final image shown in FIG 3D.

In accordance with the above embodiment, a background is not hidden by the background color of an OSD image since the user can remove the OSD image background color selectively.

Figure 4:
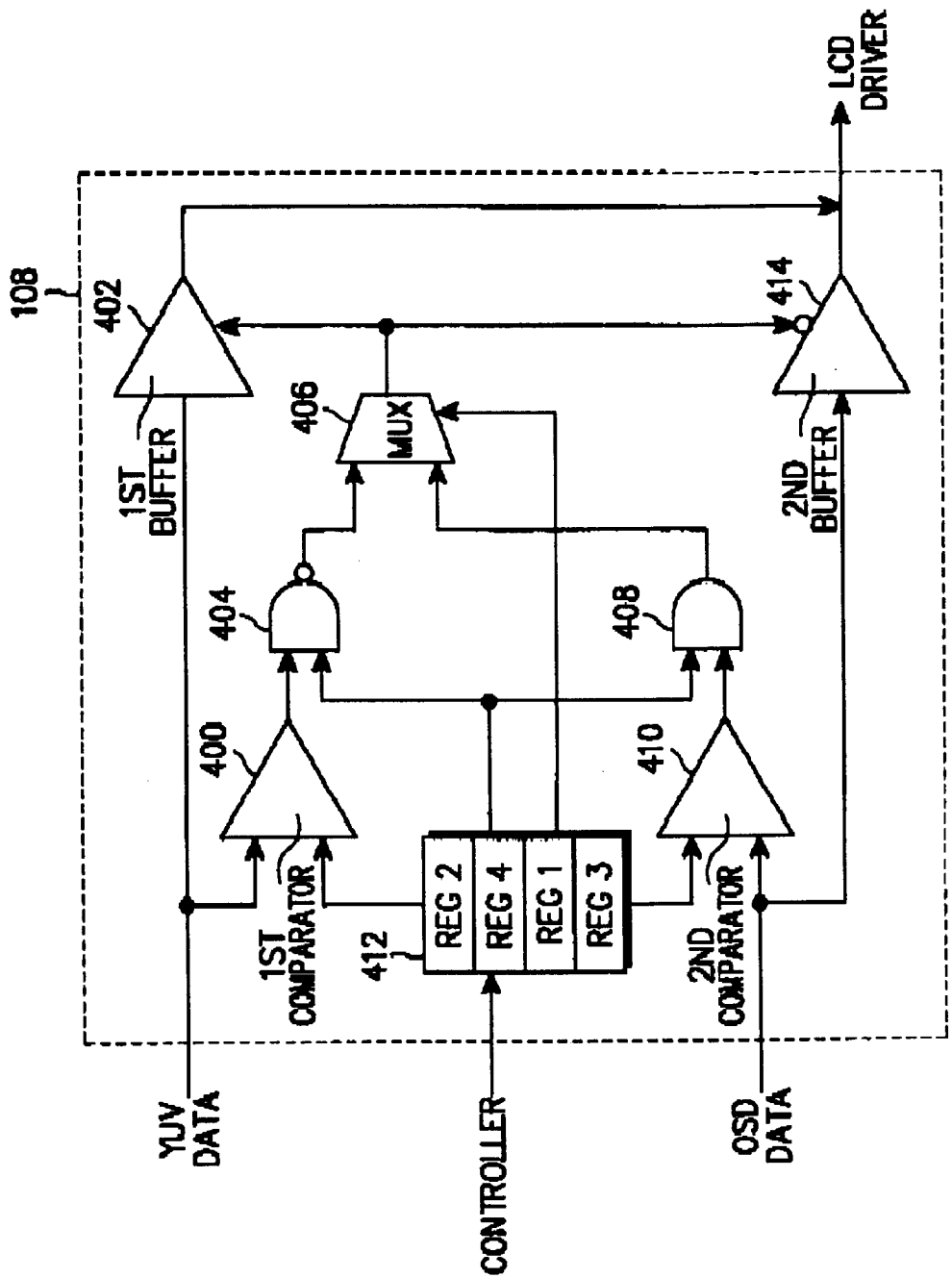
FIG. 4 is a block diagram of a transparency realizing device according to another embodiment of the present invention.

FIG. 4 is a detailed block diagram of another embodiment of the transparency-realizing device 108 for selectively rendering OSD or YUV data transparent. FIGS. 5A to 6D illustrate exemplary image displays showing operations of removing specific background colors from the OSD and YUV data in the transparency realizing device 108 of FIG. 4.

In general, OSD and YUV images are composed of a text or a graphic against a specific colored background as shown in FIGS. 5A to 6D. The OSD data and YUV data are fed to input terminals of a first comparator 400 and a second comparator 410, respectively and to a first buffer 402 and a second buffer 414, respectively in the transparency realizing device 108.

When the user requests a specific background color in the OSD or YUV data to be transparent, the controller 104 stores transparent identification data that identifies the selected background color in areas REG2 or REG3 of a register 412 connected to the other input terminals of the first and second comparators 400 and 410. The transparent identification data is used to remove the selected background color from the OSD or YUV data in the LCD 112. That is, the register 412 stores the identification data of the selected background color in the OSD image data and the identification data of a selected background color in the YUV image data in separate areas and feeds them to their corresponding comparators 400 and 410. Also, the register 412 stores transparent control data for activating the transparency-realizing device 108 in an area REG4 separately from the background color identification data. If a transparent stop command is received from the controller 104, the inverted data of the transparent control data is fed to an input terminal of a NAND gate 404 connected to the output of the first comparator 400 and an input terminal of an AND gate 408 connected to the output of the second comparator 410 in order to prevent the first and second comparators 400 and 410 from outputting the transparent identification data. The register 412 stores transparent selection data for, use in selecting an OSD/YUV transparent function and applies the transparent selection data as a selection control signal to a MUX 406 connected to the output terminals of the NAND and AND gates 404 and 408 under the control of the controller 104. Consequently, the OSD and YUV transparent functions are selectively performed.

The OSD and YUV transparent operations according to transparent selection data will be described sequentially.

Figure 5D:
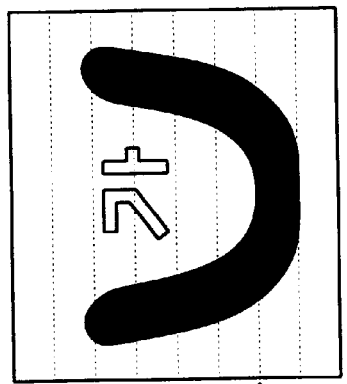
Figure 5C:
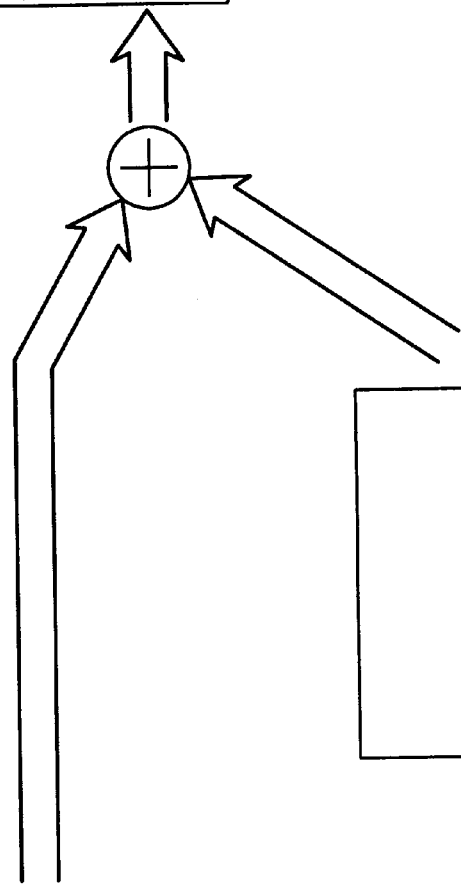
Figure 5C:
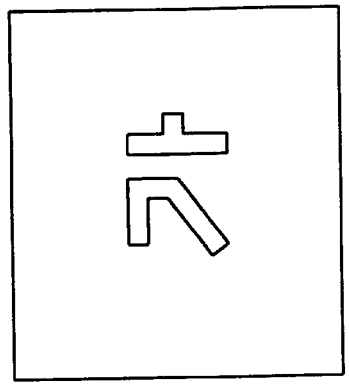
Figure 5A:
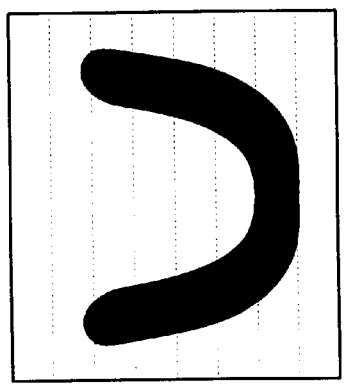
Figure 5B:
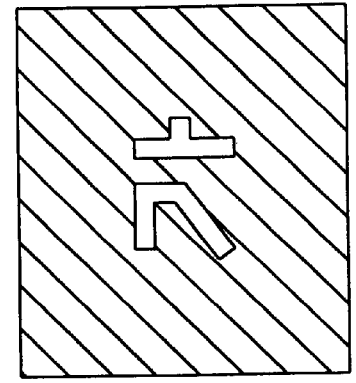

Upon request of an OSD transparent mode from the user, the controller 104 feeds the transparent control data for performing a transparent function, transparent selection data for selecting the OSD transparent function, and the identification data of a background color selected by the, user to the register 412. The transparent identification data is used to identify the selected background color in the OSD image data and remove it from the OSD image data in the LCD 112. That is, the second comparator 410, if it receives background color data corresponding to the OSD transparent identification data from the area REG3 of the register 412, outputs a logic value "1" to the AND gate 408. Then, the AND gate 408 performs an AND operation on the logic value "1" and the control data of the area REG 1 set to a logic value "1" for transparency implementation and outputs the AND-operated to the MUX 406. The MUX 406 also receives the output of the first comparator 400 for transparency of the image data through the NAND gate 404. According to the OSD transparent selection data as a selection control signal, the MUX 406 outputs only the output of the AND gate 408 as an output control signal for the three-stage buffers 402 and 414 in which YUV and OSD image data are temporarily stored. Thus, the logical value "1" for transparency of OSD data output from the MUX 406 prevents output of the OSD image data from the second buffer 414 and controls the first buffer 402 to output the YUV image data to the LCD driver 110. Therefore, if a background image of FIG. 5A is displayed on the LCD 112, an OSD image of FIG. 5C, produced by removing the transparency-selected background color from the OSD image data of FIG. 5B, and the YUV image data of FIG. 5A form a final image shown in FIG. 5D.

Upon request of a YUV transparent mode from the user, the controller 104 feeds the transparent selection data for selecting the YUV transparent function and the identification data of a background color selected by the user to the register 412. The transparent identification data is used to identify the selected background color in the YUV image data and remove it from the YUV image data in the LCD 112. That is, the first comparator 400, if it receives background color data corresponding to the YUV transparent identification data in the area REG2 of the register 412, outputs a logic value "1" to the NAND gate 404. Then, the NAND gate 404 performs a NAND operation on the logic value "1" and the control data of the area REG 1 set to a logic value "1" for transparency implementation and outputs the NAND-operated value to the MUX 406. The MUX 406 also receives the output of the second comparator 410 for transparency of the OSD image data through the AND gate 408. According to the YUV transparent selection data as a selection control signal, the MUX 406 outputs only the output of the NAND gate 404 as an output control signal for the three-stage buffers 402 and 414 in which YUV and OSD image data are temporarily stored. Thus, the logical value "0" for transparency of YUV data output from the MUX 406 prevents output of the YUV image data from the first buffer 402 and controls the second buffer 414 to output the OSD image data to the LCD driver 110.

Therefore, if a background image shown in FIG. 6A is displayed on the LCD 112, a YUV image of FIG. 6B, produced by removing the transparency-selected background color from the YUV image data FIG. 6A, and OSD image data of FIG. 6C form a final image shown in FIG. 6D. Hence, the transparent function can be performed on the YUV image data as well as the OSD image data.

In accordance with the present invention as described above, a specific background color can be made transparent in an OSD/YUV image on an LCD of a mobile terminal. Therefore, a user can change his selected color freely in the OSD/YUV image. In addition, a message associated with the current operational state and supportable function items can be output while a still image, moving pictures, and an animation are being displayed.

While the invention has been shown and described with reference to certain preferred embodiments thereof, they are mere exemplary applications. Although the transparent function has been described in the context of an OSD background color and background YUV image data, it is also applicable to any device having an OSD or an LCD. Therefore, it will be understood by those skilled in the art that various changes in form and details may be made therein without departing from the spirit and scope of the invention as defined by the appended claims.

What is claimed is:

1. A transparency realizing device in an On Screen Display (OSD) comprising:
    a first buffer for temporarily storing YUV image data for displaying a background image;
    a second buffer for temporarily storing OSD image data;
    a multiplexer for receiving output data of the first and second buffers and selectively outputting one of the YUV image data and the OSD image data according to a selection control signal;
    a register for storing identification data of a background color selected to be transparent in the OSD image data; and
    a comparator for receiving the transparency-selected background color identification color, identifying the background color data in the OSD image data based on the identification data, and outputting the selection control signal to the multiplexer for outputting the YUV image data instead of the background color data.

2. A transparency realizing device in an On Screen Display (OSD) comprising:
    a first buffer for temporarily storing YUV image data for displaying a background image;
    a second buffer for temporarily storing OSD image data;
    a register for storing identification data of background colors selected to be transparent in the OSD and YUV image data;
    a first comparator for identifying the background color data in the YUV image data in a YUV transparent mode and outputting first logical data indicating input of the transparency-selected YUV background color;
    a second comparator for identifying the background color data in the OSD image data in an OSD transparent mode and outputting second logical data indicating input of the transparency-selected OSD background color;
    a first logical device for AND-operating the first logical data received from the first comparator and control data indicating implementation of a transparent function received from the register, inverting the AND-operated value, and outputting the inverted value;
    a second logical device for AND-operating the second logical data received from the second comparator and the control data indicating implementation of a transparent function received from the register, and outputting the AND-operated value; and
    a multiplexer for receiving the output data of the first and second logical devices and selectively outputting one of the YUV image data and the OSD image data from the first or second buffer according to an OSD/YUV selection control signal stored in the register.

3. The transparency realizing device of claim 2, wherein the first logical device is a NAND gate.

4. The transparency realizing device of claim 2, wherein the second logical device is an AND gate for receiving the second logical data from the second comparator via an input terminal and the transparent function implementing control data via the other input terminal and AND-operating the received data.

5. The transparency realizing device of claim 2, wherein the register receives from a controller the transparency-selected OSD background color identification data, the transparency-selected YUV background color identification data, the transparent function implementing control data used to activate the OSD/YUV transparent function upon user request for the transparent function, and the OSD/YUV transparent selection data indicating whether the OSD/YUV image data is subject to the transparent function, and stores the received data in respective areas.

6. The transparency realizing device of claim 2, wherein the first buffer is a three-stage buffer for temporarily storing the received YUV image data and selectively outputting the YUV image data according to an output control signal that is the output data of the multiplexer.

7. The transparency realizing device of claim 2, wherein the second buffer is a three-stage buffer for temporarily storing the received OSD image data and selectively outputting the OSD image data according to an output control signal that is the output data of the multiplexer.

8. A transparency realizing method in an On Screen Display (OSD) comprising the steps of:
    setting a transparent mode if a user selects the transparent mode;
    recognizing a transparency-selected background color selected by the user from OSD image data in the transparent mode;
    updating a register value with identification data of the transparency-selected OSD background color; and
    removing the background color data corresponding to the updated register value from the OSD image data.

9. The transparency realizing method of claim 8, wherein the step of removing the OSD background color comprises the steps of:
    identifying the background color data corresponding to the updated register value in the OSD image data; and
    removing the background color data by outputting YUV image data for displaying a background instead of the OSD background color data.

10. A transparency realizing method in an On Screen Display (OSD) comprising the steps of:
    identifying a specific background color that is selected to be transparent by a user in an OSD transparent mode when the user selects a transparent function and displaying an image with YUV image data inserted instead of OSD background color data upon receipt of the OSD background color data; and
    identifying a specific background color selected to be transparent by the user in a YUV transparent mode and displaying an image with OSD image data inserted instead of YUV background color data upon receipt of the YUV background color data.

11. A transparency realizing method in an On Screen Display (OSD) comprising the steps of:

setting a transparent mode upon a user selection of a transparent function;

identifying a specific background color selected to be transparent by the user in YUV image data when a YUV transparent function is selected in the transparent mode;

updating a register value with identification data of the transparency-selected YUV background color; and displaying an image with OSD image data inserted instead of the YUV background color upon receipt of the YUV background color data corresponding to the updated register value.

12. A transparency realizing method in an On Screen Display (OSD) comprising the steps of:

setting a transparent mode upon a user selection of a transparent function;

identifying a specific background color selected to be transparent by the user in YUV image data when an OSD transparent function is selected in the transparent mode;

updating a register value with identification data of the transparency-selected OSD background color; and displaying an image with YUV image data inserted instead of the OSD background color upon receipt of the OSD background color data corresponding to the updated register value.

* * * * *